United States Patent [19]

McFarlane et al.

[11] 4,250,078

[45] Feb. 10, 1981

[54] THERMOPLASTIC POLYESTER MOLDING COMPOSITIONS

[75] Inventors: Finley E. McFarlane; Robert B. Taylor, both of Kingsport, Tenn.

[73] Assignee: Eastman Kodak Company, Rochester, N.Y.

[21] Appl. No.: 21,755

[22] Filed: Mar. 19, 1979

[51] Int. Cl.³ .............................................. C08K 3/22
[52] U.S. Cl. .................... 260/40 R; 264/26; 264/322; 525/444
[58] Field of Search ............. 260/40 R; 526/4; 264/26, 322

[56] References Cited

U.S. PATENT DOCUMENTS

| | | | |
|---|---|---|---|
| 2,280,771 | 4/1942 | Dufour et al. | 264/26 |
| 3,281,515 | 10/1966 | Schmitz | 264/236 |
| 3,499,848 | 3/1970 | Weisman | 264/26 |

*Primary Examiner*—James H. Derrington
*Attorney, Agent, or Firm*—Donald W. Spurrell; Daniel B. Reece, III

[57] ABSTRACT

This invention concerns thermoplastic polyester molding compositions containing iron oxides, particularly $Fe_2O_3$ which compositions exhibit markedly reduced heat up times and are especially useful in molding operations such as blow molding of beverage bottles. The polyester polymer may have incorporated therein by copolymerization certain anthraquinone dyes having functional groups which condense during polymerization into the polyester chain. The dye moieties are thermally stable at the polymer processing temperatures and are colorfast and nonextractable from the polymer.

4 Claims, No Drawings

THERMOPLASTIC POLYESTER MOLDING COMPOSITIONS

This invention concerns thermoplastic polyester compositions containing iron oxides, particularly $Fe_2O_3$, wherein the polyester polymer may have incorporated therein by copolymerization certain anthraquinone dyes having functional groups which condense during polymerization into the polyester chain. The polyester compositions exhibit markedly reduced heat up times and are especially useful in molding operations such as the blow molding of beverage bottles, or other shaped articles whether blow molding or other molding techniques are employed. The dye moieties are thermally stable at the polymer processing temperatures and are colorfast and nonextractable from the polymer.

In the preparation of plastic bottles and the like by blow molding or other such operations which require heat softening of the polymer, the heat up time is of course important to productivity as well as dictating energy requirements. In a typical blow molding operation for making bottles, intense radiation energy from, for example, quartz heaters is used to heat the bottle parisons (test tube shaped preforms) to above the glass transition temperature of the polymer, e.g., 85°–95° C. in the case of many polyesters. Typically, this heat up time is about 21 seconds and controls the rate of production and the energy requirements.

An object therefore of this invention is to provide a heat softenable polyester molding composition requiring markedly reduced heat up times. This and other objects hereinafter appearing have been attained in accordance with the present invention through the discovery that the addition of from about 1 to about 300 parts of iron oxide, preferably $Fe_2O_3$ which may be hydrated, to polyester (one million parts), which polyester preferably is colored by copolymerization with certain anthraquinone dyes imparts thermal properties thereto which markedly increases its heat up rate and hence reduces the time required to produce a molding therefrom.

In its broad sense, the process aspects of the invention may be defined as a process for making molded articles comprising preparing a preform of thermoplastic polyester admixed with from about 1 to about 300 ppm of $Fe_2O_3$, subjecting said preform to radiant energy for a period of time necessary to raise its temperature to above the glass transition temperature of the polymer, and subsequently forming said preform into a desired shape. The term "glass transition temperature" is defined generally as the temperature at which the polyester changes from a glass-like material to a rubbery or leathery material. A more comprehensive discussion of this subject including measuring the glass transition temperature, is contained in Polymer Science, 1972, North-Holland Publishing Company, Chapter 3.

The more effective concentration of the iron oxide is from about 5.0 to about 100 ppm, preferably from about 20 to about 60 ppm with 30–50 ppm being most preferred. The iron oxide is used in very finely divided form, e.g., from about 0.01 to about 200 μm, preferably from about 0.1 to about 10.0 μm, and most preferably from about 0.2 to about 50 μm. Such oxides are described, for example, on pages 323–349 of Pigment Handbook, Vol. 1, copyright 1973, John Wiley & Sons, Inc.

The iron oxide can be added to the polyester reactant system, during or after polymerization, to the polyester melt, or to the molding powder or pellets from which the bottle parisons are formed. For purposes of clarification, the bottle parisons or preforms are test tube shaped, extrusion moldings which are heated above the glass transition temperature of the polymer and then positioned in the bottle mold to receive the pressurized air through its open end. Such technology is well known to the art as shown in U.S. Pat. No. 3,733,309. Any radiant energy source may be employed, and the one used by applicants for heating the parisons is a quartz lamp, Model Q-1P, 650 W., 120 V., by Smith Victor Corp.

Brightly colored polymers can be obtained by copolymerization with one or more of the copolymerizable dyes, and practically any color can be obtained with the proper combination of blue, red, and yellow dyes of this type. If desired, other known pigments, fillers and the like may be admixed with the polymers to give the effects needed.

The dyes useful herein have the structure

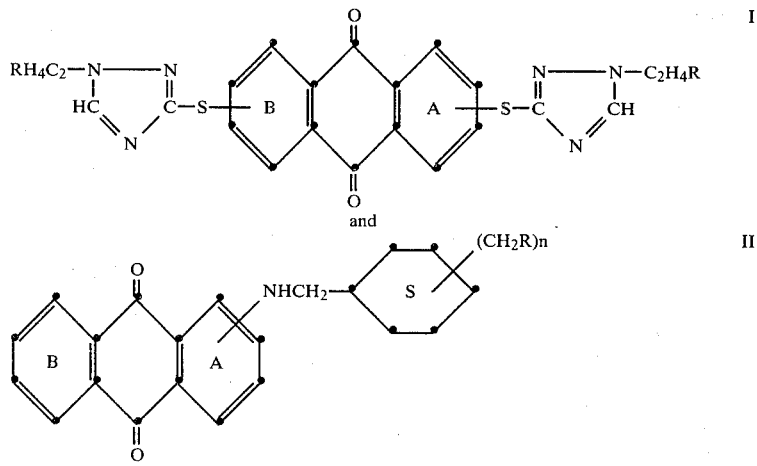

wherein R is —OH, —COOR[1] or —COX wherein R[1] is —H or a radical such as lower alkyl which may be used in polyester forming condensation reactions, X is halogen, n is 1 or 2, and either A or B of II must contain, and A or B of I may contain, at least one additional

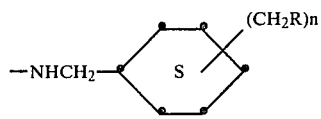

group. Each of rings A and B may be further substituted with 1-3 radicals such as lower alkyl which may be substituted with lower alkoxy, phenyl, Cl, Br, and lower alkanoylamino; lower alkoxy which must be substituted with lower alkoxy, phenyl, Cl, Br, and lower alkanoylamino; chlorine; bromine; amino; lower alkyl amino which may be substituted with lower alkoxy, cyclohexyl, phenyl, Cl, Br, and lower alkanoylamino; aryl amino; arylthio; and aroylamino; wherein each aryl is 6-10 carbons and preferably phenyl in each case; lower alkylsulfonyl; lower alkylthio; lower alkanoylamino; cyclohexylamino; and the like.

The dyes of formula II of this invention are in general prepared by reacting anthraquinone intermediates containing labile groups such as halogen, hydroxyl, nitro, sulfonic acid, phenoxy, or the like with aminomethylcyclohexane methanol. The intermediate amine may be either 2, 3 or 4-aminomethylcyclohexane methyl derivatives such as methanol or mixtures thereof, and a mixture of cis and trans isomers may be utilized. The following procedures illustrate the preparative methods:

EXAMPLE 1—Preparation of 1,5-Bis[[[4-(hydroxymethyl)-cyclohexyl]methyl]amino]anthraquinone A mixture of 1,5-dichloroanthraquinone (77.6 g), trans-4-aminomethylcyclohexane methanol (180 g), methyl cellosolve (280 ml), and potassium carbonate (38.7 g) was stirred and heated at reflux for about eight hours. The mixture was cooled below 100° C. and hot water (350 ml) was added. The dye was collected by filtering at about 80° C. and washed with methanol and then water. The moist cake was slurried in methyl cellosolve (500 ml) and the mixture heated to reflux. After cooling to room temperature, the dye was collected by filtration, washed with acetone, and finally with water. The yield of red dye was 110 g or about 80% of the theoretical yield.

EXAMPLE 2—Preparation of 1,4-Bis[[[4-(hydroxymethyl)cyclohexyl]methyl]amino]anthraquinone A mixture of quinizarin (37.5 g) and lecuoquinizarin (12.5 g) was added portionwise over about one hour to trans-4-aminomethylcyclohexane methanol (200 g) at 125°-130° C. The temperature was held at 125°-130° C. for an additional two hours and then the reaction mixture was added with stirring to a 2% aqueous sodium hydroxide solution (800 ml). Air and steam were blown through the mixture for about one hour and then the dye was collected by filtration and washed with water. The moist cake was slurried in isopropanol (250 ml) at 55°-60° C. and the mixture was then filtered. The dye cake was washed with acetone and then dried in air. The yield was 78 g or about 77% of the theoretical yield.

Further detail concerning procedures for preparation of anthraquinone compounds similar to the above may be found in the following books: H. A. Lubs, "The Chemistry of Synthetic Dyes and Pigments", Reinhold Publishing Corporation, New York, 1955, pp 337-550; H. Fierz-David and L. Blangey, "Fundamental Processes of Dye Chemistry", Interscience Publishers, Inc., New York, 1949, pp 224-348. The dyes of formula I are disclosed and claimed in U.S. Pat. No. 3,689,501 and this patent may be referred to for specific details regarding preparation thereof.

EXAMPLE 3—Preparation of Copolymer Containing Copolymerized Red Dye (The ppm is based on one million parts of the total polymer)

145.5 g (0.75 moles) dimethyl terephthalate
89.0 g (1.44 moles) ethylene glycol
32.8 g (0.23 moles) 1,4-cyclohexanedimethanol
50 ppm Mn, 250 ppm Sb, 30 ppm Ti, 70 ppm P
100 ppm red dye, 1,5-bis[[[4-(hydroxymethyl)cyclohexyl]methyl]amino]anthraquinone
38 ppm $Fe_2O_3$ non-hydrated The above reactants, with the exception of P, are added to a 500-ml round bottom flask fitted with a stirrer, condensate take-off, and nitrogen inlet head. The flask and contents are immersed in a Wood's metal bath at approximately 170° C. The temperature is raised to 195° C. and maintained for two hours and 20 minutes while ester exchange of the dimethyl terephthalate, ethylene glycol, 1,4-cyclohexanedimethanol, and 1,5-bis[[[4-(hydroxymethyl)cyclohexyl]methyl]amino]anthraquinone takes place. The temperature is then raised to 215° C. and maintained for one hour and 30 minutes to complete the ester exchange. The temperature is raised to 240° C. and the P added. The temperature is then raised to 285° C. At 285° C., the melt is placed under 0.10 mm vacuum and polymerization continued for 45 minutes. The resulting polymer obtained in essentially 100% yield is brilliant red and has an inherent viscosity of about 0.706 in phenol/tetrachloroethane solvent.

EXAMPLE 4—Preparation of Copolymer Containing Copolymerized Blue Dye

This composition is the same as in Example 1 except 100 ppm of blue dye, 1,4-bis[[[4-(hydroxymethyl)cyclohexyl]methyl]amino]anthraquinone, is used. The ester exchange and polymerization conditions are the same as in Example 1 and the resulting polymer is dark blue and has an inherent viscosity of about 0.742 in phenol/tetrachloroethane solvent.

EXAMPLE 5—Preparation of Green Polyester Composition 145.5 g (0.75 moles) dimethyl terephthalate
93.0 g (1.50 moles) ethylene glycol
120 ppm Ti catalyst
800 ppm yellow dye 1,5-bis[[1-(2-hydroxyethyl)-1,2,4-triazol-3-yl]thio]anthraquinone
150 ppm phthalocyanine blue pigment
30 ppm red dye 1,5-bis[[[4-(hydroxymethyl)cyclohexyl]methyl]amino]anthraquinone
40 ppm $Fe_2O_3$ non-hydrated The ester interchange and polymerization are carried out as in Example 1. The resulting polymer is "Emerald Green" and has an inherent viscosity of about 0.661 in phenol/tetrachloroethane solvent.

EXAMPLE 6—Preparation of Green Polyester Composition 145.5 g (0.75 moles) dimethyl terephthalate
93.0 g (1.50 moles) ethylene glycol
120 ppm Ti catalyst 400 ppm yellow dye, 1,5-bis[[1-(2-hydroxyethyl)-1,2,4-triazol-3-yl]thio]anthraquinone
100 ppm phthalocyanine blue pigment
15 ppm red dye, 1,5-bis[[[4-hydroxymethyl)cyclohexyl]methyl]amino] anthraquinone
200 ppm $Fe_2O_3$ non-hydrated The ester exchange and polymerization are carried out as described in Example 1. The resulting polymer is "Emerald Green," similar to the polymer produced in Example 3, and has an inherent viscosity of about 0.732 in phenol/tetrachloroethane solvent.

EXAMPLE 7—Preparation of "Blue-White" Polyester Composition

This example shows that low concentrations of copolymerized red and blue dyes can be used to substantially cover the yellow of the base polymer and give a polymer with a clear, "blue-white" appearance suitable for beverage bottle application.
145.50 g (0.75 moles) dimethyl terephthalate
93.00 g (1.50 moles) ethylene glycol
50 ppm Mn, 250 ppm Sb, 30 ppm Ti, 70 ppm P
5 ppm red dye
7 ppm blue dye-1,4-bis[[[4-(hydroxymethyl)cyclohexyl]methyl]amino]anthraquinone
40 ppm $Fe_2O_3$ The ester exchange and polymerization of this polymer is carried out as described in Example 1. The resulting polymer is clear, "blue-white" and has an inherent viscosity of about 0.624 in phenol/tetrachloroethane solvent.

EXAMPLE 8—Preparation of "Blue-White" Polyester Composition 145.50 g (0.75 moles) dimethyl terephthalate
70.00 g (1.12 moles) ethylene glycol
32.80 g (0.23 moles) 1,4-cyclohexanedimethanol
55 ppm Mn, 50 ppm Ti, 100 ppm P
7 ppm blue dye, 1,4-bis[[[4-(hydroxymethyl)cyclohexyl]methyl]amino]anthraquinone
1 ppm red dye, 1,5-bis[[[4-(hydroxymethyl)cyclohexyl]methyl]amino]anthraquinone
38 ppm $Fe_2O_3$ The ester exchange and polymerization of this polymer is carried out as described in Example 1. The resulting polymer is clear, "blue-white", and has an inherent viscosity of approximately 0.626 in phenol/tetrachloroethane solvent.

Preparation of Plain Polyester 145.50 g (0.75 moles) dimethyl terephthalate
93.00 g (1.50 moles) ethylene glycol
50 ppm Mn, 250 ppm Sb, 30 ppm Ti, 70 ppm P
40 ppm $Fe_2O_3$ The ester exchange and polymerization of this polymer is carried out as described in Example 1. The resulting polymer is clear, and has an inherent viscosity of about 0.624 in phenol/tetrachloroethane solvent.

Preparation of Plain Polyester Composition 145.50 g (0.75 moles) dimethyl terephthalate
70.00 g (1.12 moles) ethylene glycol
32.80 g (0.23 moles) 1,4-cyclohexanedimethanol
55 ppm Mn, 50 ppm Ti, 1000 ppm P,
38 ppm $Fe_2O_3$ The ester exchange and polymerization of this polymer is carried out as described in Example 1. The resulting polymer is clear, and has an inherent viscosity of approximately 0.626 in phenol/tetrachloroethane solvent.

The above polymers when formed into parisons and blow-molded into beverage bottles clearly demonstrate that the heat up time necessary to soften the parisons is reduced by about 25% over the same polyesters which are not admixed with $Fe_3O_3$. The apparatus employed to form the parisons is any of the typical injection molding machines, and the reheat and blow molding apparatus using high intensity, quartz heaters, is typified by Corpoplast BAB-4 machines.

The useful types of polyesters are those disclosed for example in U.S. Pat. Nos. 2,465,319, 3,668,277; 3,560,445; 3,733,309; and Br. 578,079. Among the useful polyesters are those produced from one or more diols such as 1,4-bis(hydroxymethyl)cyclohexane; ethylene glycol; 1,2-propanediol; 1,3-propanediol; 1,2-butanediol; 2,3-butanediol; 1,3-butanediol; 1,4-butanediol; 2,2-dimethyl-1,3-propanediol; 2,3-propanediol; 1,6-hexanediol; 2-ethylhexanediol; 1,2-cyclohexanediol; 1,4-cyclohexanediol; 1,2-bis(hydroxymethyl)-cyclohexane; 1,3-bis(hydroxymethyl)cyclohexane; x,8-bis-(hydroxymethyl)tricyclo-[5.2.1.0]-decane wherein x represents 3, 4 or 5; and diols containing one or more oxygen atoms in the chain, e.g., diethylene glycol, triethylene glycol, dipropylene glycol or tripropylene glycol. In general, these diols contain two to 18, preferably two to 12 carbon atoms. Cycloaliphatic diols can be employed in their cis or trans configuration or as a mixture of both forms.

The acids used to form the polyester component may comprise one or more of a cyclic dicarboxylic acid and/or acyclic dicarboxylic acid. Examples of suitable aromatic and cycloaliphatic dicarboxylic acids are terephthalic acid, isophthalic acid, hexahydroterephthalic acid, tetrahydrophthalic acid, hexahydrophthalic acid, hexahydroisophthalic acid, as well as endomethylene- and endoethylene-tetrahydrophthalic acid, hexachloroendomethylenetetrahydrophthalic acid or tetrabromophthalic acid. The cycloaliphatic dicarboxylic acids can be employed in their trans or cis configuration or as a mixture of both forms. The use of dicarboxylic acids wherein the carboxyl groups are arranged in the 1,2- or in the 1,3-position is preferred. Especially preferred are those dicarboxylic acids wherein the carboxyl groups are arranged in the 1,2-position. Of these, phthalic acid and hexahydrophthalic acid are especially preferred. In general, the cyclic dicarboxylic acids contain eight to 12 carbon atoms, preferably eight to 10 carbon atoms. The carbocyclic dicarboxylic acids are preferred, especially the monocyclic carboxylic, e.g, wherein the ring is a benzene, cyclohexane or bridged cyclohexane ring. In place of the cyclic and/or acyclic dicarboxylic acids themselves, it is possible and often preferable to use a functional acid derivative thereof. For example, instead of the free dicarboxylic acids, esters thereof with lower-alkanols can also be employed, e.g., the dimethyl, diethyl or dipropyl ester. The anhydrides of the dicarboxylic acids can likewise be employed, e.g., phthalic anhydride, hexahydrophthalic anhydride and tetrahydrophthalic anhydride. The most useful polyesters have an inherent viscosity of at least about 0.55 as measured at a 1% concentration of polymer in a 37.5/62.5 weight percent solution of tetrachloroethane/phenol, respectively, at 30° C.

Particularly useful polyesters which may also contain the copolymerized dyes as described above include (a)

polymers wherein at least about 97% by weight of the polymer contains the repeating ethylene terephthalate units of the formula:

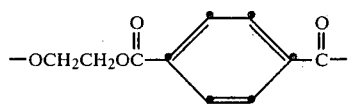

with the remainder being minor amounts of ester-forming components, and (b) copolymers of ethylene terephthalate wherein up to about 10 mole percent of the glycol is selected from one or more of diethylene glycol; propane-1,3-diol; butane-1,4-diol; polytetramethylene glycol; polyethylene glycol; polypropylene glycol; and 1,4-hydroxymethylcyclohexane; and up to about 30 mole percent of the acid is selected from one or more of isophthalic; bibenzoic; naphthalene 1,4- or 2,6-dicarboxylic; adipic; sebacic; and decane-1,10-dicarboxylic acid.

In addition, the poly(ethylene terephthalate) polymers can be admixed with various additives that do not adversely affect the polymer in use such as stabilizers, e.g., antioxidants or ultraviolet light screening agents, extrusion aids, additives designed to make the polymer more degradable or combustible, such as oxidation catalyst, as well as dyes or pigments.

The polyesters can be produced according to conventional processes, e.g., with or without a catalyst, with or without the introduction of an inert gas stream, as solution condensation in a solvent, as a melt condensation or azeotropic esterification, at temperatures of up to 250° C., or higher so that the water or alkanol produced by the esterification is continuously removed. The esterification takes place almost quantitatively and can be followed by measuring the hydroxyl and acid numbers. The esterification temperature may be selected so that the losses of readily volatile substances remain small, i.e., during at least the first period of the esterification, the process is conducted at a temperature below the boiling point of the lowest-boiling starting substance.

The anthraquinone dye components comprise coloring amounts, i.e., from about 1.0 to about 5,000 and preferably about 2.0 to about 1500 parts of each of one or more of the dyes per million parts of polyester. The novel colored compositions of the present invention are linear thermoplastic polyesters, containing from about 5 to about 300 ppm iron oxide, and a coloring amount of the residue of one or more of the compounds of the formula

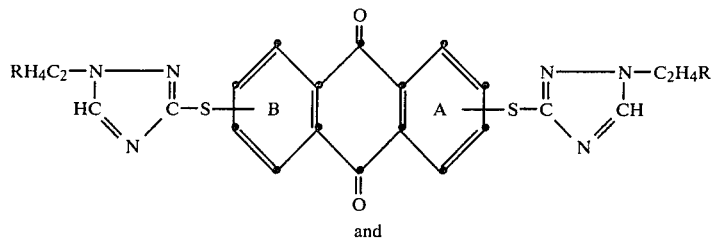

and

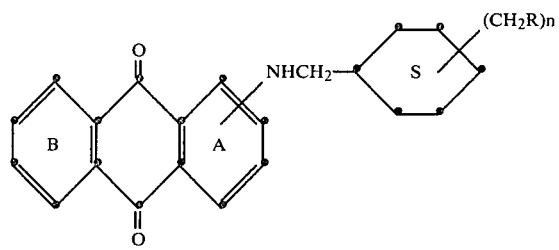

wherein R is —OH, —COOR$^1$ or —COX wherein R$^1$ is —H or lower alkyl, X is halogen, n is 1 or 2, either A or B of II must contain, and A or B of I may contain at least one additional

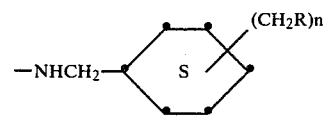

group, and rings A and B may be substituted with 1–3 groups selected from lower alkyl, which may be substituted with lower alkoxy, phenyl, Cl, Br, and lower alkanoylamino; lower alkoxy which may be substituted with lower alkoxy, phenyl, Cl, Br, and lower alkanoylamino; chlorine; bromine; amino; lower alkyl amino which may be substituted with lower alkoxy, phenyl, Cl, Br, and lower alkanoylamino; aryl amino; arylthio; and aroylamino; wherein each aryl is 6–10 carbons and preferably phenyl in each case; lower alkylsulfonyl; lower alkylthio; lower alkanoylamino; cyclohexylamino and the like.

The preferred novel colored polymers of the present invention are defined as linear thermoplastic polyesters having an I.V. of from about 0.4 to about 0.8, the acid moiety of which comprises at least about 50 mole percent terephthalic acid residue, and the glycol moiety of which comprises at least about 50 mole percent ethylene glycol or 1,4-cyclohexanediol residue, and containing from about 5 to about 300 ppm Fe$_2$O$_3$, and from about 2.0 to about 1500 parts per million of each of one or more copolymerized dyes of the formulae

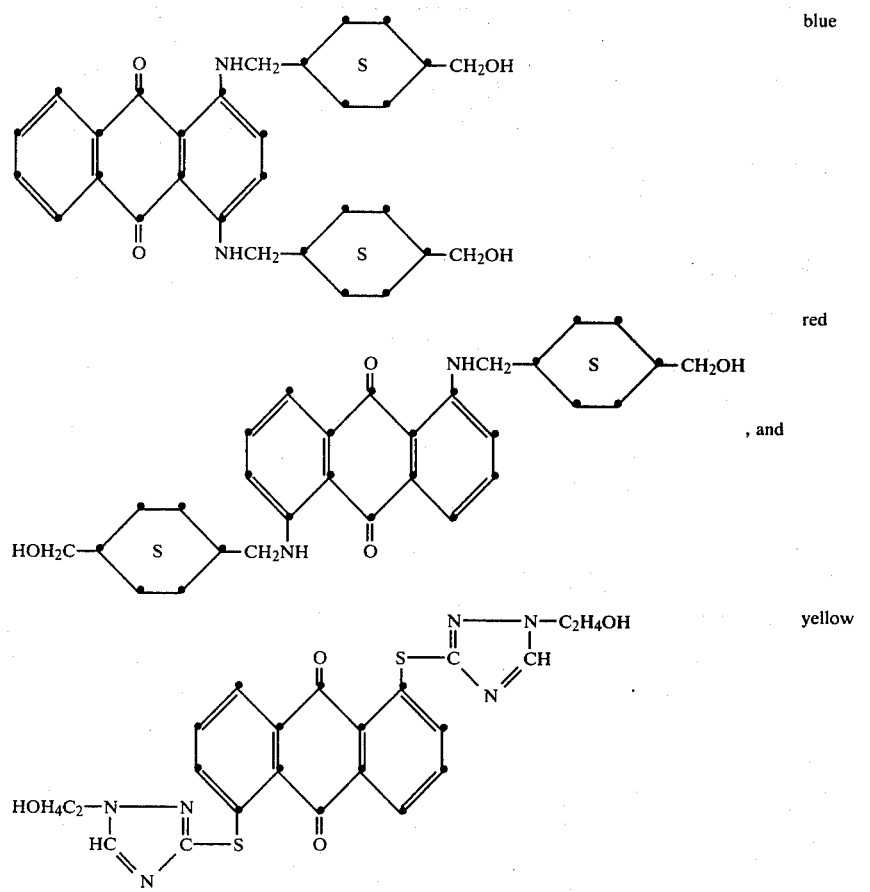

blue red

, and yellow

A preferred polyester is prepared from dimethyl terephthalate, ethylene glycol, from 0 to about 30 mole % of 1,4-cyclohexanedimethanol based on total moles of glycol, and from about 2.0 to about 1,500 parts of each of one or more of the above three dyes per one million parts of polyester.

The following table gives dyes useful in practicing the present invention.

TABLE 1
Derivatives of Dyes I and II Above

| Example No. | Substituents on Ring A | Substituents on Ring B |
|---|---|---|
| 9 | 1,4-di—NHCH$_2$—⟨S⟩—CH$_2$OH | 6-CH$_3$ |
| 10 | 1-NHCH$_2$—⟨S⟩—CH$_2$OH | 5-NHCH$_2$—⟨S⟩—CH$_2$OH |
| 11 | 1-NHCH$_2$—⟨S⟩ (CH$_2$OH) | 5-NHCH$_2$—⟨S⟩ (CH$_2$OH) |
| 12 | 2-NHCH$_2$—⟨S⟩—CH$_2$OH | 6-NHCH$_2$—⟨S⟩—CH$_2$OH |
| 13 | 1-NHCH$_2$—⟨S⟩—CH$_2$OH | 8-NHCH$_2$—⟨S⟩—CH$_2$OH |
| 14 | 1-NHCH$_2$—⟨S⟩—CH$_2$OH, 4-Br | 8-NHCH$_2$—⟨S⟩—CH$_2$OH, 5-Br |
| 15 | 1-NHCH$_2$—⟨S⟩—CH$_2$OH, 4-NH$_2$ | 8-NHCH$_2$—⟨S⟩—CH$_2$OH, 5-NH$_2$ |
| 16 | 1-NHCH$_2$—⟨S⟩—CH$_2$OH, 4-NHCH$_3$ | 8-NHCH$_2$—⟨S⟩—CH$_2$OH, 5-NHCH$_3$ |

TABLE 1-continued

Derivatives of Dyes I and II Above

| Example No. | Substituents on Ring A | Substituents on Ring B |
|---|---|---|
| 17 | 1-NHCH₂—[S]—CH₂OH, 4-NH—[pyridyl] | 8-NHCH₂—[S]—CH₂OH, 5-NH—[pyridyl] |
| 18 | 1-NHCH₂—[S]—CH₂OH, 4-NH—[phenyl] | 8-NHCH₂—[S]—CH₂OH, 5-NH—[phenyl] |
| 19 | 1-NHCH₂—[S]—CH₂OH, 4-NH—[phenyl-CH₃] | 8-NHCH₂—[S]—CH₂OH, 5-NH—[phenyl-CH₃] |
| 20 | 1-NHCH₂—[S]—CH₂OH, 4-NH—[phenyl-Cl] | 8-NHCH₂—[S]—CH₂OH, 5-NH—[phenyl-Cl] |
| 21 | 1-NHCH₂—[S]—CH₂OH, 4-NHCH₂—[phenyl] | 8-NHCH₂—[S]—CH₂OH, 5-NHCH₂—[phenyl] |
| 22 | 1-NHCH₂—[S]—CH₂OH, 4-NHC₂H₄OCH₃ | 8-NHCH₂—[S]—CH₂OH, 5-NHC₂H₄OCH₃ |
| 23 | 1-NHCH₂—[S]—CH₂OH, 4-NHCH₂—[S] | 8-NCH₂—[S]—CH₂OH, 5-NHCH₂—[S] |
| 24 | 1-NHCH₂—[S]—CH₂OH, 4-Cl | None |
| 25 | 1-NHCH₂—[S]—CH₂OH, 4-SC₂H₅ | 5-NHCH₂—[S]—CH₂OH, 8-SCH₃ |
| 26 | 1-NHCH₂—[S]—CH₂OH, 4-OCH₃ | None |
| 27 | 1-NHCH₂—[S](CH₂OH), 4-S—[phenyl-C(CH₃)₃] | 5-NHCH₂—[S](CH₂OH), 8-S—[phenyl-C(CH₃)₃] |
| 28 | 1-NHCH₂—[S]—CH₂OH, 4-SO₂CH₃ | 5-NHCH₂—[S]—CH₂OH, 8-SO₂CH₃ |
| 29 | 1,4-di—NHCH₂—[S]—CH₂OH, 2-Br | None |
| 30 | 1,4-di—NHCH₂—[S]—CH₂OH, 2-OC₆H₅ | None |
| 31 | 1,4-di—NHCH₂—[S]—CH₂OH, 2-SO₂C₂H₅ | None |
| 32 | 1,4-di—NHCH₂—[S]—CH₂OH, 2,3-di—Cl | None |
| 33 | 2-NHCH₂—[S]—CH₂OH, 1-Br | 6-NHCH₂—[S]—CH₂OH, 5-Br |
| 34 | 1-NHCH₂—[S]—CH₂OH | 5-NHCH₂—[S]—CH₂OH<br>50:50 Mixture<br>8-NhCH₂—[S]—CH₂OH |
| 35 | 1,4-di—NHCH₂—[S]—CH₂OH | 6-C₂H₄Cl |
| 36 | 1-NHCH₂—[S](CH₂OH), 4-C₂H₄OCH₃ | 5-NHCH₂—[S](CH₂OH) |
| 37 | 1-NHCH₂—[S](CH₂OH), 4-OC₂H₄OC₂H₅ | 5-NHCH₂—[S](CH₂OH) |

TABLE 1-continued
Derivatives of Dyes I and II Above

| Example No. | Substituents on Ring A | Substituents on Ring B |
|---|---|---|
| 38 | 1-NHCH$_2$—[S]—CH$_2$OH, 2-C$_2$H$_4$NHCOCH$_3$ | 6-NHCH$_2$—[S]—CH$_2$OH |
| 39 | 1-NHCH$_2$—[S]—CH$_2$OH, 2-CH$_2$—C$_6$H$_5$ | 8-NHCH$_2$—[S]—CH$_2$OH |
| 40 | 1-NHCH$_2$—[S]—CH$_2$OH, 4-OCH$_2$CH$_2$Cl | 8-NHCH$_2$—[S]—CH$_2$OH, 5-OCH$_2$CH$_2$Cl |
| 41 | 1-NHCH$_2$—[S]—CH$_2$OH, 4-OCH$_2$CH$_2$NHCOCH$_3$ | 8-NHCH$_2$—[S]—CH$_2$OH, 5-OCH$_2$CH$_2$NHCOCH$_3$ |
| 42 | 1-NHCH$_2$—[S]—CH$_2$OH, 4-OCH$_2$C$_6$H$_5$ | 8-NHCH$_2$—[S]—CH$_2$OH, 5-OCH$_2$C$_6$H$_5$ |
| 43 | 1-NHCH$_2$—[S]—CH$_2$OH, 4-H—NHC$_2$H$_4$Ph | 8-NHCH$_2$—[S]—CH$_2$OH, 5-NH—C$_2$H$_4$Ph |
| 44 | 1-NHCH$_2$—[S]—CH$_2$OH, 4-H—NHCOCH$_3$ | 8-NHCH$_2$—[S]—CH$_2$OH, 5-NH—COCH$_3$ |
| 45 | 1-NHCH$_2$—[S]—CH$_2$OH, 4-NH—[Ph-CH$_3$] | 8-NHCH$_2$—[S]—CH$_2$OH, 5-NH—[Ph-CH$_3$] |
| 46 | 1-NHCH$_2$—[S]—CH$_2$OH, 4-NH—[Ph-Cl,Cl] | 8-NHCH$_2$—[S]—CH$_2$OH, 5-NH—[Ph-Cl,Cl] |
| 47 | 1-NHCH$_2$—[S]—CH$_2$OH, 4-NHCH$_2$—[Ph] | 8-NHCH$_2$—[S]—CH$_2$OH, 5-NHCH$_2$—[Ph] |

The invention has been described in detail with particular reference to preferred embodiments thereof, but it will be understood that variations and modifications can be effected within the spirit and scope of the invention.

We claim:

1. Polyester molding composition selected from (a) polymers wherein at least about 97% by weight of the polymer contains the repeating ethylene terephthalate units of the formula:

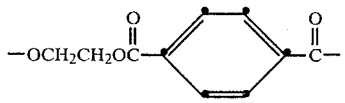

with the remainder being minor amounts of ester-forming components, and (b) copolymers of ethylene terephthalate wherein up to about 30 mole percent of the glycol is selected from one or more of diethylene glycol; propane-1,3-diol; butane-1,4-diol; polytetramethylene glycol; polyethylene glycol; polypropylene glycol and 1,4-hydroxymethylcyclohexane; and up to about 30 mole percent of the acid is selected from one or more of isophthalic; bibenzoic; naphthalene 1,4- or 2,6-dicarboxylic, adipic; sebacic; and decane-1,10-dicarboxylic acid, and (c) said polymers containing a coloring amount of the copolymerized residue of one or more compounds of the formula

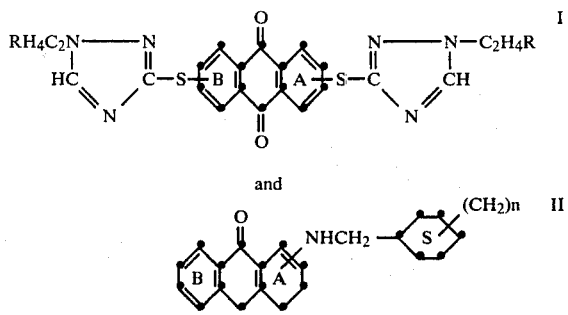

wherein R is —OH, —COOR$^1$ or —COX wherein R$^1$ is —H or lower alkyl, X is halogen, n is 1 or 2, either A or B of II must contain, and A or B of I may contain, at least one additional

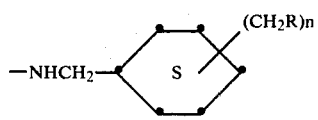

group, each of rings A and B may be further substituted with 1–3 radicals selected from lower alkyl which may be substituted with lower alkoxy, phenyl, Cl, Br, and lower alkanoylamino; lower alkoxy which may be substituted with lower alkoxy, phenyl, Cl, Br, and lower alkanoylamino; chlorine; bromine; amino; lower alkyl amino which may be substituted with lower alkoxy, cyclohexyl, phenyl, Cl, Br, and lower alkanoylamino;

aryl amino; arylthio, and aroylamino; wherein each aryl is 6–10 carbons; lower alkylsulfonyl; lower alkylthio; lower alkanoylamino; and cyclohexylamino; wherein said polymers are admixed with from about 1 to about 300 ppm of iron oxide.

2. The composition of claim 1 wherein one or more of the coloring compounds are each present in concentrations of from about 1.0 to about 5,000 parts per million of polyester, and said compounds have the formulae

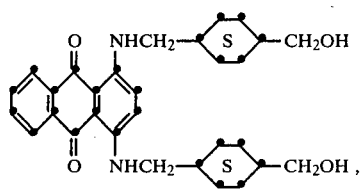

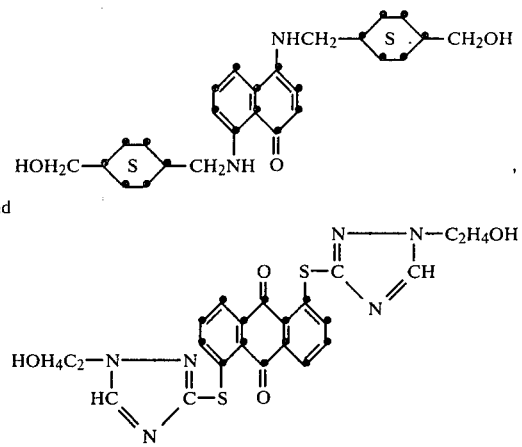

3. The composition of claim 2 wherein the polyester has an I.V. between about 0.6 and 0.8 and is prepared from dimethyl terephthalate, ethylene glycol, and from 0 to about 30 mole % of 1,4-cyclohexanedimethanol based on total moles of glycol, the iron oxide is $Fe_2O_3$ in a concentration of from 5 to about 300 ppm, and each of the coloring compounds may be present in reacted form in concentrations of from about 2.0 to about 1500 parts per million parts of polyester.

4. The composition of claim 2 wherein the concentration of $Fe_2O_3$ is from about 20 to about 60 ppm and has a particle size of between about 0.1 and about 10.0 μm.

* * * * *

UNITED STATES PATENT AND TRADEMARK OFFICE
CERTIFICATE OF CORRECTION

PATENT NO. : 4,250,078
DATED : February 10, 1981
INVENTOR(S) : Finley E. McFarlane and Robert B. Taylor It is certified that error appears in the above—identified patent and that said Letters Patent is hereby corrected as shown below:

Column 14, lines 44-49, the structure should read

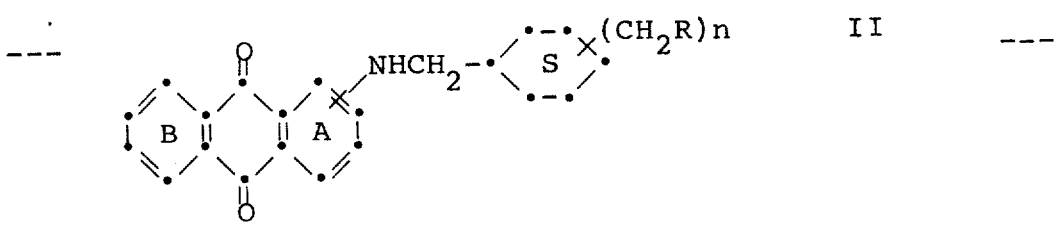

Column 16, lines 1-8, the structure should read

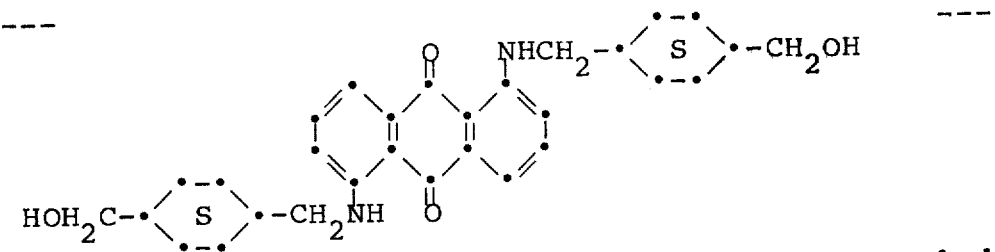

Signed and Sealed this

Seventeenth Day of November 1981

[SEAL]

Attest:

GERALD J. MOSSINGHOFF

*Attesting Officer*   *Commissioner of Patents and Trademarks*